United States Patent
Lee et al.

(10) Patent No.: US 12,340,137 B2
(45) Date of Patent: Jun. 24, 2025

(54) IIMAGE DISPLAY DEVICE AND CONTROL METHOD THEREFOR USING ELECTRO-OPTICAL TRANSFER FUNCTION (EOTF) CURVES FOR DISPLAYING A HIGH DYNAMIC RANGE (HDR) IMAGE

(71) Applicant: LG ELECTRONICS INC., Seoul (KR)

(72) Inventors: Jaejun Lee, Seoul (KR); Taehyoung Kim, Seoul (KR); Seunghee Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/710,108

(22) PCT Filed: Nov. 10, 2022

(86) PCT No.: PCT/KR2022/017613
§ 371 (c)(1),
(2) Date: May 14, 2024

(87) PCT Pub. No.: WO2023/085795
PCT Pub. Date: May 19, 2023

(65) Prior Publication Data
US 2025/0013412 A1    Jan. 9, 2025

(30) Foreign Application Priority Data
Nov. 15, 2021    (KR) ......................... 10-2021-0156957

(51) Int. Cl.
*G06F 3/14* (2006.01)
*G06V 10/60* (2022.01)
*G09G 5/10* (2006.01)

(52) U.S. Cl.
CPC ................ *G06F 3/14* (2013.01); *G06V 10/60* (2022.01); *G09G 5/10* (2013.01)

(58) Field of Classification Search
CPC . G06F 3/14; G06V 10/60; G09G 5/10; G09G 3/3208; G09G 2320/0626; G09G 2320/0693
See application file for complete search history.

(56) References Cited

U.S. PATENT DOCUMENTS 11,551,389 B2 *   1/2023   Baran ....................... G06T 5/92
2018/0330674 A1 *  11/2018  Baar ...................... H05B 45/20
(Continued)

FOREIGN PATENT DOCUMENTS

JP     2011-237850 A    11/2011
KR   10-2019-0056752 A    5/2019

*Primary Examiner* — Rodney Amadiz
(74) *Attorney, Agent, or Firm* — Birch, Stewart, Kolasch & Birch, LLP

(57) ABSTRACT

The present disclosure relates to: an image display device having an EOTF for an HDR image which can maximize the expression or vividness of an HDR image output in the image display device even if the output brightness range according to the hardware performance of the image display device is narrower than the brightness range of the HDR image; and a control method therefor. According to one aspect of the present disclosure, an image display device may be provided, the image display device comprising: a display; a storage unit for storing a plurality of EOTF curves for displaying an HDR content image; and a control unit for causing the content image to be displayed by using EOTF curves, from among the plurality of EOTF curves, corresponding to the maximum output brightness of the display and the maximum content brightness of the content.

20 Claims, 14 Drawing Sheets

(56) References Cited

U.S. PATENT DOCUMENTS

| | | | |
|---|---|---|---|
| 2019/0158793 A1* | 5/2019 | Oh | G06T 11/001 |
| 2019/0251680 A1* | 8/2019 | Kozuka | H04N 5/66 |
| 2019/0279598 A1* | 9/2019 | Mito | H04N 1/6058 |
| 2020/0410957 A1* | 12/2020 | Takatori | G09G 5/10 |
| 2021/0136297 A1* | 5/2021 | Park | H04N 5/77 |
| 2021/0152801 A1* | 5/2021 | Wang | H04N 7/0135 |

* cited by examiner

FIG. 5

| Panel Peak Brightness (Nit) | MaxcLL | Knee point (% of Panel Peak Brightness) |
|---|---|---|
| 400 | 400 | 100% |
| | 1000 | 62.5% |
| | 2000 | 60% |
| | 4000 | 50% |
| | 10000 | 40% |

(5-1)

| Panel Peak Brightness (Nit) | MaxcLL | Knee point (% of Panel Peak Brightness) |
|---|---|---|
| 400 | 0<MaxcLL≤400 | 100% |
| | 400<MaxcLL≤1000 | 62.5% |
| | 1000<MaxcLL≤2000 | 60% |
| | 2000<MaxcLL≤4000 | 50% |
| | 4000<MaxcLL≤10000 | 40% |

| Panel Peak Brightness (Nit) | MaxcLL | Knee point (% of Panel Peak Brightness) |
|---|---|---|
| 500 | 500 | 100% |
| | 1000 | 50% |
| | 2000 | 45% |
| | 4000 | 40% |
| | 10000 | 30% |

(8-1)

| Panel Peak Brightness (Nit) | MaxcLL | Knee point (% of Panel Peak Brightness) |
|---|---|---|
| 500 | 0<MaxcLL≤500 | 100% |
| | 500<MaxcLL≤1000 | 50% |
| | 1000<MaxcLL≤2000 | 45% |
| | 2000<MaxcLL≤4000 | 40% |
| | 4000<MaxcLL≤10000 | 30% |

| Panel Peak Brightness (Nit) | MaxcLL | Knee point (% of Panel Peak Brightness) |
|---|---|---|
| 700 | 700 | 100% |
|  | 1000 | 50% |
|  | 2000 | 45% |
|  | 4000 | 40% |
|  | 10000 | 30% |

(11-1)

| Panel Peak Brightness (Nit) | MaxcLL | Knee point (% of Panel Peak Brightness) |
|---|---|---|
| 700 | 0<MaxcLL≤700 | 100% |
|  | 700<MaxcLL≤1000 | 50% |
|  | 1000<MaxcLL≤2000 | 45% |
|  | 2000<MaxcLL≤4000 | 40% |
|  | 4000<MaxcLL≤10000 | 30% |

(11-2)

IIMAGE DISPLAY DEVICE AND CONTROL METHOD THEREFOR USING ELECTRO-OPTICAL TRANSFER FUNCTION (EOTF) CURVES FOR DISPLAYING A HIGH DYNAMIC RANGE (HDR) IMAGE

CROSS REFERENCE TO RELATED APPLICATIONS

This application is the National Phase of PCT International Application No. PCT/KR2022/017613, filed on Nov. 10, 2022, which claims priority under 35 U.S.C. 119 (a) to Patent Application No. 10-2021-0156957, filed in the Republic of Korea on Nov. 15, 2021, all of which are hereby expressly incorporated by reference into the present application.

TECHNICAL FIELD

The present disclosure relates to an image display device for outputting a High Dynamic Range (HDR) image and a method of controlling the same.

BACKGROUND ART

An image display device is a device with a function of receiving, processing, and displaying a digital image, such as a digital TV and a monitor.

A digital image generally consists of three channels of RGB, and a Standard Dynamic Range (SDR) image can express brightness in a range of 0~255 (8 bits) for each channel. However, in an SDR image, since the brightness range that can be expressed in each channel is narrow, a dark part is often not properly expressed or a bright part is often not properly expressed. For example, in the case of an image in which a brightness difference between the dark part and the bright part is remarkable, such as a picture taken in reverse light, a contrast balance is skewed to one side. Accordingly, a big difference may occur between a scene viewed with the naked eye and an SDR image photographed thereon. In comparison to such an SDR image, an image expressed in 16 bits or 32 bits for each channel is referred to as a High Dynamic Range (HDR) image, and the HDR image has the advantage of being able to express an image more realistically as it has a wider brightness expression power.

When an image is inputted, an image display device may output the inputted image based on an Electro-Optical Transfer Function (EOTF) stored in the image display device. The EOTF is a function that defines a mutual conversion relationship between electrical information of an HDR image and optical brightness information on outputting it.

As EOTF for HDR images, Perceptual Quantizer (PQ) functions according to the Society of Motion Picture and Television Engineers (SMPTE) standard and Hybrid Log Gamma (HLG) functions according to the Association of Radio Industries and Businesses (ARIB) standard are currently widely used.

However, if the output brightness range according to the hardware performance of the image display device is narrower than the brightness range of the HDR image itself, there is a problem that the expressiveness or vitality of the HDR image (especially the bright part) outputted from the image display device may decrease if the EOTF for the HDR image is used as it is.

DISCLOSURE

Technical Tasks

One technical task of the present disclosure is to provide an image display device equipped with an EOTF for HDR images, which may maximize an expressive power or vitality of the HDR image outputted from the image display device despite that an output brightness range according to the hardware performance of the image display device is narrower than a brightness range of the HDR image itself, and a control method thereof.

Technical Solutions

In one technical aspect of the present disclosure, provided is an apparatus for displaying an image, the apparatus including a display, a storage unit storing a plurality of EOTF curves for displaying a content image for HDR, and a controller configured to control to display the content image using an EOTF curve related to a maximum output brightness of the display and a maximum content brightness of the content image among a plurality of the EOTF curves.

A plurality of the EOTF curves may have different knee points and maximum content brightness points according to the maximum output brightness and the maximum content brightness, respectively.

Information on the maximum content brightness may be stored as metadata in the content image.

A first EOTF curve among a plurality of the EOTF curves may include a first maximum output point according to the maximum content brightness equal to the maximum output brightness.

The first EOTF curve may be generated based on an EOTF standard curve.

A second EOTF curve among a plurality of the EOTF curves may include a first knee point and a second maximum content brightness point according to the maximum content brightness greater than the maximum output brightness.

The second EOTF curve may be generated in a manner that a Quadratic Bezier Curve based on a first maximum output point, a first knee point, and a second maximum content brightness point is reflected on the first EOTF curve.

The controller may control the display to display a user interface for calibrating a plurality of the EOTF curves.

The controller may provide a menu for setting the maximum output brightness of the display and a menu for calibrating each of a plurality of EOTF curves according to the set maximum output brightness through the user interface.

The controller may control the calibrated EOTF curve to be displayed for a preview on the user interface.

In another technical aspect of the present disclosure, provided is a method of controlling an image display apparatus, the method including storing a plurality of EOTF curves for displaying a content image for HDR and displaying the content image based on a maximum output brightness of a display and an EOTF curve corresponding to a maximum content brightness of the content image among a plurality of the EOTF curve curves.

Advantageous Effects

Effects of an image display device and control method thereof according to the present disclosure will be described as follows.

According to at least one of embodiments of the present disclosure, even if an output brightness range according to hardware performance of the image display device is narrower than a brightness range of an HDR image itself, there is an advantage in that an EOTF for an HDR image, which may maximize an expressive power or vitality of the HDR image outputted from the image display device, may be provided in the image display device.

In addition, according to at least one of the embodiments of the present disclosure, there is an advantage in that a user interface facilitating a user to calibrate the EOTF for the HDR image according to his or her preference may be provided.

DESCRIPTION OF DRAWINGS

FIG. 5 is a table for explaining a knee point of FIG. 3.

FIG. 8 is a table for explaining a knee point of FIG. 6.

FIG. 11 is a table for explaining a knee point of FIG. 9.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms "module" and "unit" attached to describe the names of components are used herein to help the understanding of the components and thus should not be considered as having specific meanings or roles. Accordingly, the terms "module" and "unit" may be used interchangeably.

In addition, each of these elements may be configured as a separate individual hardware module or implemented as two or more hardware modules. Two or more elements may be implemented as a single hardware module. In some cases, at least one of these elements may be implemented as software.

Aspects of this disclosure will be described in detail with reference to the attached drawings, but it should be understood that they are merely illustrative of this disclosure and should not be interpreted as limiting the scope of this disclosure.

In addition, although the terms used in this disclosure are selected from generally known and used terms, some of the terms mentioned in the description of this disclosure, the detailed meanings of which are described in relevant parts of the description herein, have been selected at the discretion of the applicant. Furthermore, this disclosure must be understood, not simply by the actual terms used but by the meanings of each term lying within.

Figure 1:
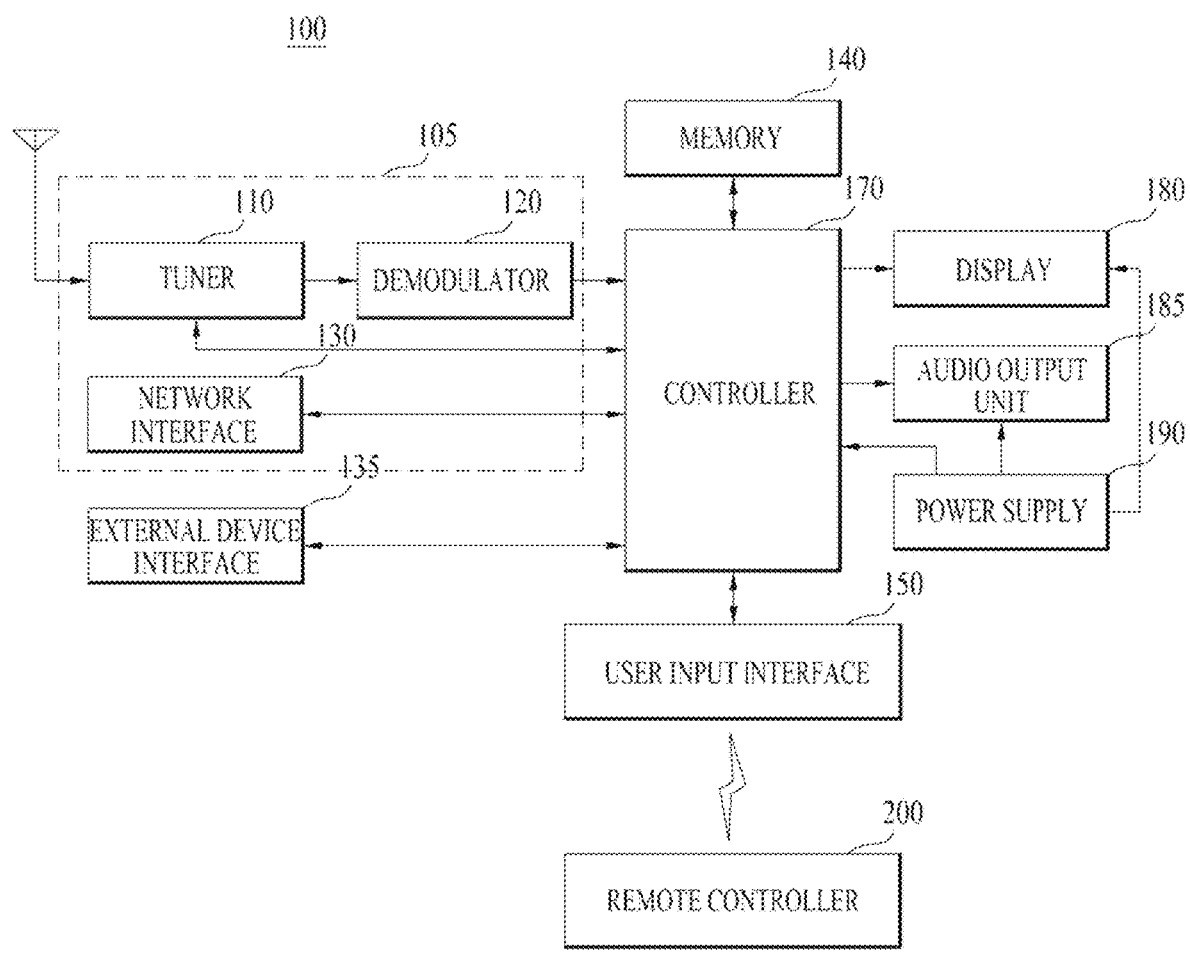
FIG. 1 is a schematic block diagram of an image display device according to an embodiment of the present disclosure.

FIG. 1 is a schematic block diagram of an image display device according to one embodiment of the present disclosure. The image display device may be a display device capable of outputting an image including a display panel. The image display device may include a computer monitor, a TV, a projector, a smartphone, a laptop, a digital signage, etc.

Referring to FIG. 1, an image display device 100 according to one aspect of this disclosure includes a broadcast receiver 105, an external device interface 135, a memory 140, a user input interface 150, a controller 170, a display 180, an audio output unit 185, a power supply 190, and a camera module (not shown). When the image display device 100 is a computer monitor, it may not include at least one of the broadcast receiver 105, the audio output unit 183, and the camera unit.

The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

In an aspect of this disclosure, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g. video files, still image files, music files, text files, and application files) to the user.

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 1, the controller 170 may include a DEMUX and a video processor, which will be described later with reference to FIG. 10.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program.

Especially the controller 170 may access a network and download an application or application list selected by the user to the image display device 100 over the network.

For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 1 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Figure 2:
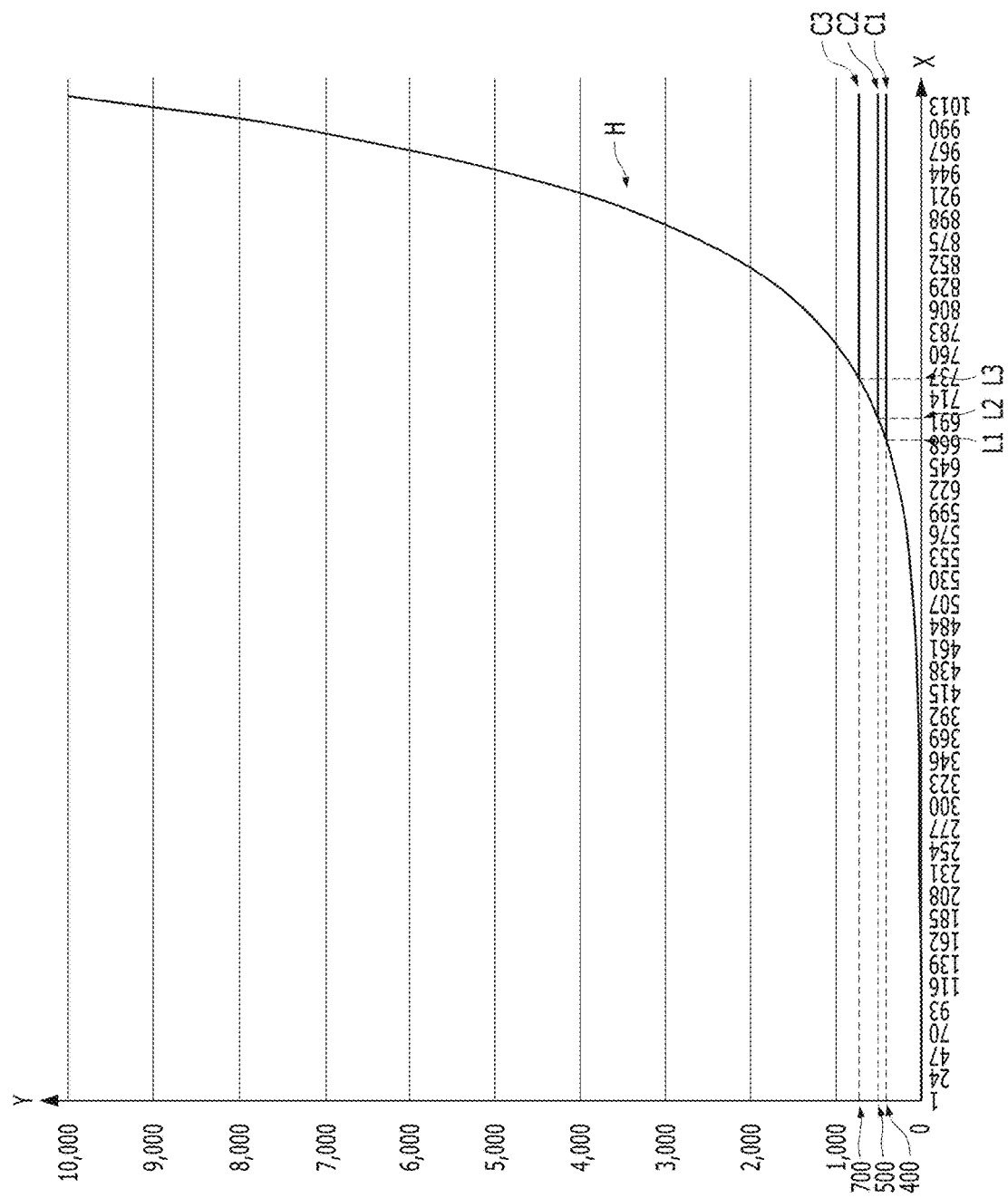
FIG. 2 is a diagram showing an EOTF standard curve for an HDR image.

Hereinafter, an EOTF standard curve for an HDR image will be described with reference to FIG. 2. FIG. 2 illustrates an EOTF standard curve for an HDR image. In FIG. 2, as an example of an EOTF standard curve, an HDR PQ standard curve according to an HDR PQ function is illustrated. In FIG. 2, an X-axis represents a brightness of a content image for an HDR and a Y-axis represents a brightness of an output image of an image display device.

The HDR PQ standard curve H above is standardized in the SMPTE standard to follow a log curve so that the darkest part of an HDR image is outputted as 0 nits and the brightest part thereof is outputted as 10000 nits.

However, in general, an image display device on the market can only output images of up to 1000 nits to the maximum at the highest brightness.

When a maximum output brightness (i.e., maximum panel brightness) of a display panel of the image display device is 400 nits and a content image is outputted according to the HDR PQ standard curve H, all images produced to be brighter than a first image brightness L1 in the content should saturated and displayed. When the maximum output brightness of the display panel of the image display device is 400 nits and the content image is displayed according to the HDR PQ standard curve H, the relationship between the content image brightness and the output image brightness of the image display device may be denoted by a first curve C1.

Similarly, if the maximum output brightness of the display panel of the image display device is 500 nits and the content image is outputted according to the HDR PQ standard curve H, all images brighter than a second image brightness L2 in the content should be saturated and displayed. When the maximum output brightness of the display panel of the image display device is 500 nits and the content image is displayed according to the HDR PQ standard curve H, the relationship between the content image brightness and the output image brightness of the image display device may be denoted by a second curve C2.

In addition, similarly, if the maximum output brightness of the display panel of the image display device is 700 nits and the content image is outputted according to the HDR PQ standard curve H, all parts of the content brighter than a third image brightness L3 should be saturated and displayed. When the maximum output brightness of the display panel of the image display device is 700 nits and the content image is displayed according to the HDR PQ standard curve H, the relationship between the content image brightness and the output image brightness of the image display device may be denoted by a third curve C3.

Therefore, if the HDR PQ standard curve is applied to the image display device 100 as it is, there is a problem that the expressive power or vitality of the HDR image (particularly a bright part) outputted from the image display device 100 may be reduced. Therefore, in order to make the expressive power or vitality of the HDR image (particularly the bright part) outputted from the image display device, the HDR PQ standard curve needs to be appropriately modified and used according to the maximum output brightness of the image display device and the maximum content brightness of the content to be displayed on the image display device.

Figure 3:
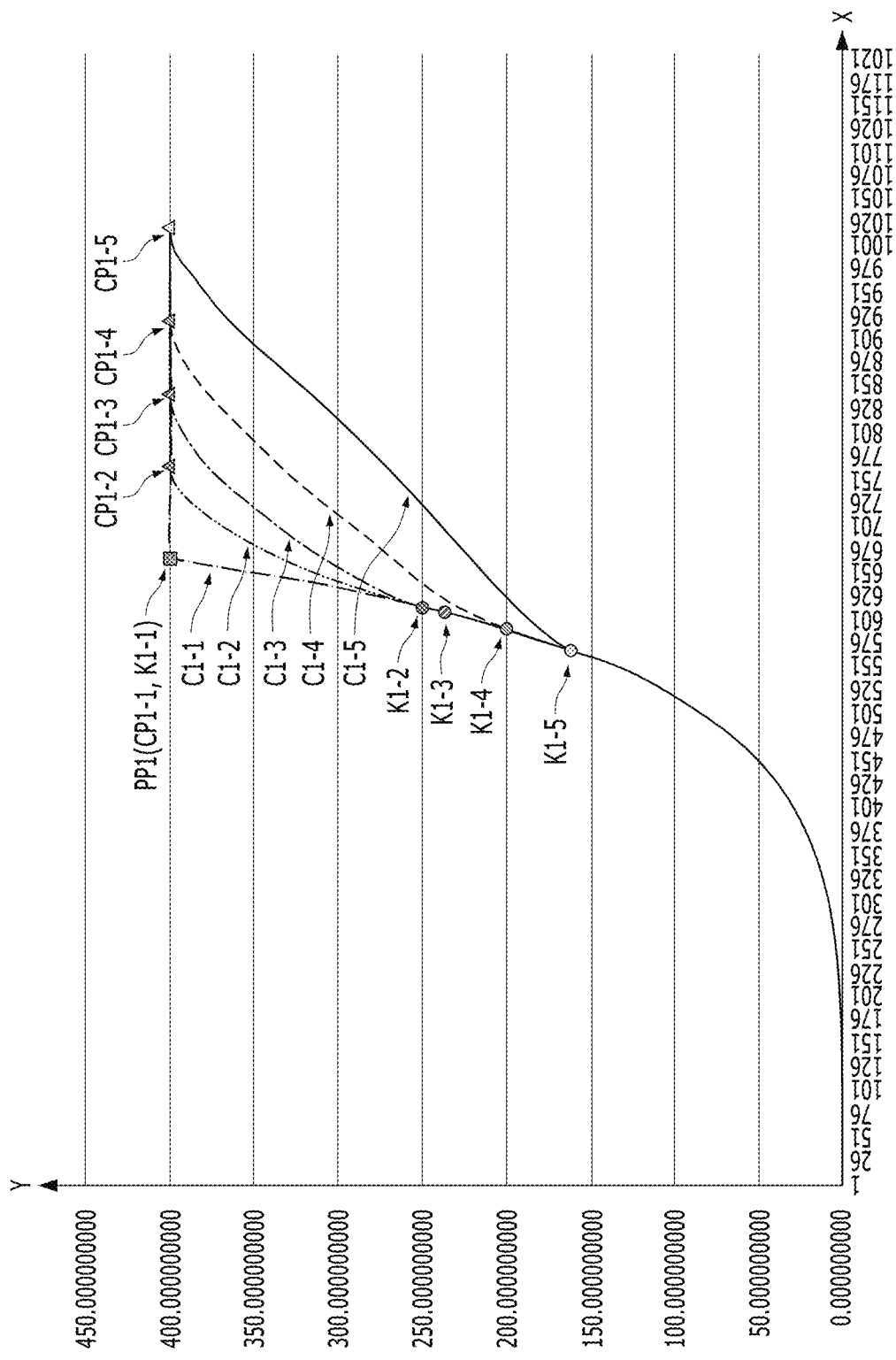
FIG. 3 is a diagram showing an EOTF curve for an HDR image according to an embodiment of the present disclosure.

This will be described further with reference to FIG. 3. FIG. 3 illustrates an EOTF curve for an HDR image according to an embodiment of the present disclosure. In FIG. 3, an HDR PQ curve according to an HDR PQ function is exemplarily illustrated as an example of an EOTF. In FIG. 3, an X-axis represents a brightness of a content image for an HDR, and a Y-axis represents a brightness of an output image of an image display device. In FIG. 3, it is assumed that a maximum output brightness of the image display device is a first maximum output brightness (e.g., 400 nits).

A plurality of HDR PQ curves may be generated for the image display device 100 having the first maximum output brightness. For example, one of a plurality of the HDR PQ curves may be selected according to a maximum content brightness of the content image to be displayed on the image display device 100 and used to output the content image to the image display device 100. The maximum content brightness may be stored as metadata in the content image. Accordingly, when the content image is displayed on the image display device 100, information on the maximum content brightness of the content image may be provided to the image display device 100. Then, the controller 170 of the image display device 100 may select an HDR PQ curve corresponding to the maximum content brightness from a plurality of the HDR PQ curves, and display the content image according to the selected HDR PQ curve.

In FIG. 3, five HDRPQ curves C1-1, C1-2, C1-3, C1-4, and C1-5 are illustrated for the first maximum output brightness. Less or more HDR PQ curves may have been generated.

The (1-1)th HDR PQ curve C1-1 is for the case where the maximum content brightness of the content image is equal to the first maximum output brightness (400 nits), as the first maximum content brightness (e.g., 400 nits). When the maximum content brightness of the content image is equal to the maximum output brightness of the image display device 100, the content image having the first maximum content brightness may be displayed without being saturated on the image display device 100 even along the first curve C1 according to the HDR PQ standard curve H. Accordingly, the (1-1)th HDR PQ curve C1-1 may be the same as the first curve C1 of FIG. 2. When the (1-1)th HDR PQ curve C1-1 is compared with the HDR PQ standard curve H, a first maximum output brightness point PP1 may be defined. The (1-1)th HDR PQ curve C1-1 may be clipped with respect to a content image brightness that is brighter than the first maximum output brightness point PP1. The first maximum output brightness point PP1 may also be understood as a maximum content brightness point described later in the (1-1)th HDR PQ curve C1-1, that is, a (1-1)th maximum content brightness point CP1-1.

The (1-2)th HDR PQ curve C1-2 is for the case where the maximum content brightness of the content image is a second maximum content brightness (e.g., 1000 nits). When the (1-2)th HDR PQ curve C1-2 is compared with the (1-1)th HDR PQ curve C1-1, a (1-2)th knee point K1-2 and a (1-2)th maximum content brightness point CP1-2 may be defined. The (1-2)th HDR PQ curve C1-2 may branch from the (1-1)th HDR PQ curve C1-1 (or the HDR PQ standard curve H) by starting from a content image brightness brighter than the (1-2)th knee point K1-2, and may be clipped with respect to the content image brightness brighter than the (1-2)th maximum content brightness point CP1-2.

The (1-3)th HDR PQ curve C1-3 is for the case where the maximum content brightness of the content image is a third maximum content brightness (e.g., 2000 nits). When the (1-3)th HDR PQ curve C1-3 is compared with the (1-1)th HDR PQ curve C1-1, a (1-3)th knee point K1-3 and a (1-3)th maximum content brightness point CP1-3 may be defined. The (1-3)th HDR PQ curve C1-3 may branch from the (1-1)th HDR PQ curve C1-1 (or the HDR PQ standard curve H) by starting from the (1-3)th knee point K1-3, and may be clipped with respect to a content image brightness brighter than the (1-3)th maximum content brightness point CP1-3. The (1-3)th knee point K1-3 may be formed at an output image brightness lower than the (1-2)th knee point K1-2, and the (1-3)th maximum content brightness point CP1-3 may be formed at a content image brightness brighter than the (1-2)th maximum content brightness point CP1-2.

The (1-4)th HDR PQ curve C1-4 is for the case where the maximum content brightness of the content image is a fourth maximum content brightness (e.g., 4000 nits). When the (1-4)th HDR PQ curve C1-4 is compared with the (1-1)th HDR PQ curve C1-1, a (1-4)th knee point K1-4 and a (1-4)th maximum content brightness point CP1-4 may be defined. The (1-4)th HDR PQ curve C1-4 may branch from the (1-1)th HDR PQ curve C1-1 (or the HDR PQ standard curve H) by starting from the (1-4)th knee point K1-4, and may be clipped with respect to a content image brightness brighter than the (1-4)th maximum content brightness point CP1-4. The (1-4)th knee point K1-4 may be formed at an output image brightness lower than the (1-3)th knee point K1-3, and the (1-4)th maximum content brightness point CP1-4 may be formed at a content image brightness brighter than the (1-3)th maximum content brightness point CP1-3.

The (1-5)th HDR PQ curve C1-5 is for the case where the maximum content brightness of the content image is a fifth maximum content brightness (e.g., 10000 nits). When the (1-5)th HDR PQ curve C1-5 is compared with the (1-1)th HDR PQ curve C1-1, a (1-5)th knee point K1-5 and a (1-5)th maximum content brightness point CP1-5 may be defined. The (1-5)th HDR PQ curve C1-5 may branch from the (1-1)th HDR PQ curve C1-1 (or the HDR PQ standard curve H) by starting from the (1-5)th knee point K1-5, and may be clipped with respect to a content image brightness brighter than the (1-5)th maximum content brightness point CP1-5. The (1-5)th knee point K1-5 may be formed at an output image brightness lower than the (1-4)th knee point K1-4, and the (1-5)th maximum content brightness point CP1-5 may be formed at a content image brightness brighter than the (1-4)th maximum content brightness point CP1-4.

Figure 4:
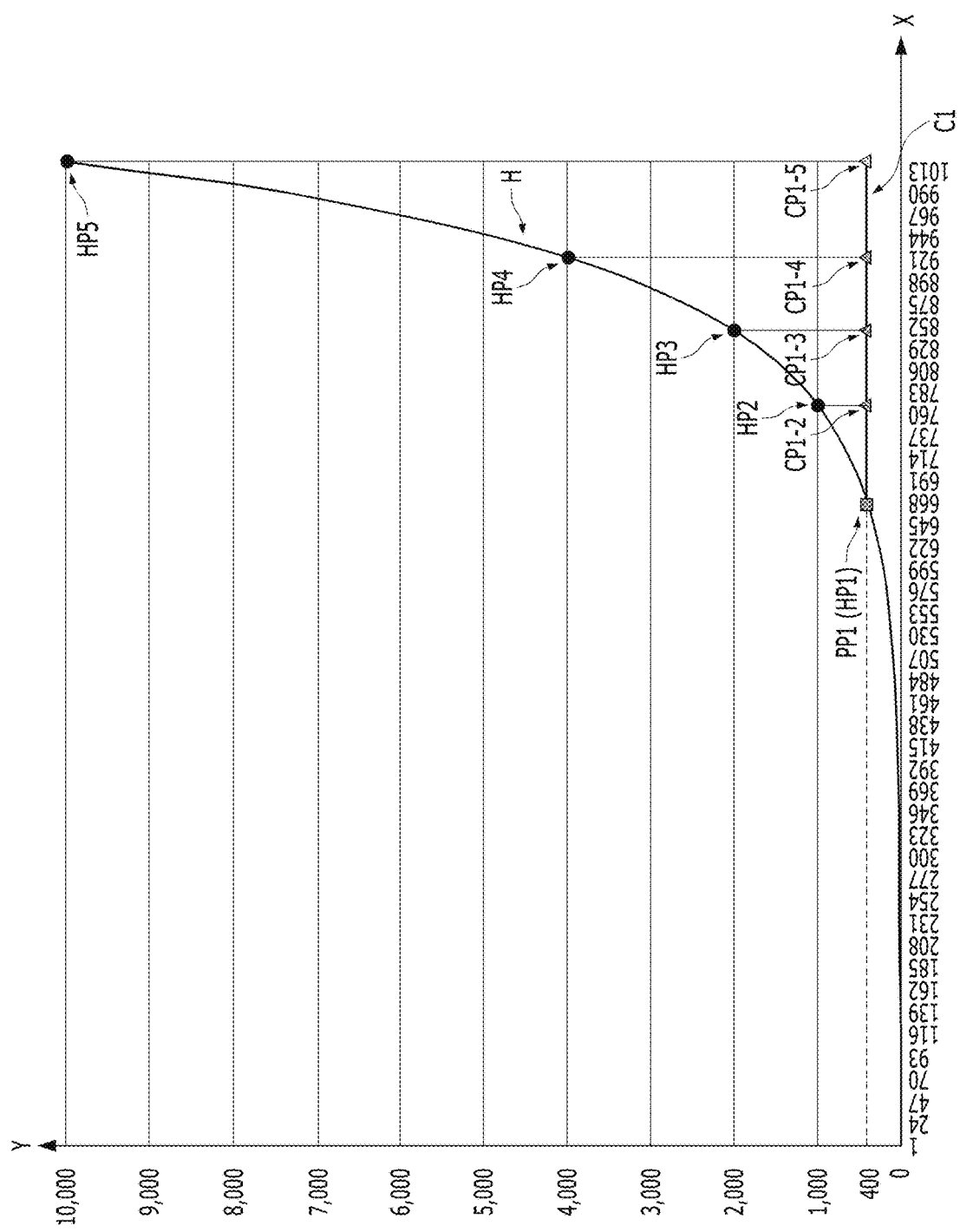
FIG. 4 is a graph for explaining a maximum output brightness point and the maximum content brightness point of FIG. 3.

The first maximum output brightness point PP1, the (1-2)th maximum content brightness point CP1-2, the (1-3)th maximum content brightness point CP1-3, the (1-4)th maximum content brightness point CP1-4, and the (1-5)th maximum content brightness point CP1-5 in FIG. 3 will be described further with reference to FIG. 4. FIG. 4 is a graph for describing the maximum output brightness point and the maximum content brightness point in FIG. 3.

FIG. 4 is a diagram showing the HDR PQ standard curve H and the first curve C1 described in FIG. 2.

As shown in FIG. 4, on the HDR PQ standard curve H, a first HDR PQ point HP1, a second HDR PQ point HP2, a third HDR PQ point HP3, a fourth HDR PQ point HP4, and a fifth HDR PQ point HP5 corresponding to the first maximum content brightness (400 nits), the second maximum content brightness (1000 nits), the third maximum content brightness (2000 nits), the fourth maximum content brightness (4000 nits), and the fifth maximum content brightness (10000 nits), respectively may be denoted.

Points respectively projected on the first curve C1 in the Y-axis direction from the first HDR PQ point HP1, the second HDR PQ point HP2, the third HDR PQ point HP3, the fourth HDR PQ point HP4, and the fifth HDR PQ point HP2 may be the first maximum output brightness point PP1, the (1-2)th maximum content brightness point CP1-2, the (1-3)th maximum content brightness point CP1-3, the (1-4)th maximum content brightness point CP1-4, and the (1-5)th maximum content brightness point CP1-5 described in FIG. 3, respectively.

The (1-2)th knee point K1-2, a (1-3)th knee point K1-3, the (1-4)th knee point (K1-4), and the (1-5)th knee point K1-5 of FIG. 3 will be described with further reference to FIG. 5. FIG. 5 is a table for describing the knee point in FIG. 3.

As shown in FIG. 5 (5-1), when the maximum output brightness of the image display device is the first maximum output brightness (400 nits), a knee point according to each maximum content brightness (Maximum Content Light Level (MaxcLL)) of the content image may be defined as a percentage of the first maximum output brightness.

In FIG. 5 (5-1), when the content image has the first maximum content brightness (400 nits), the (1-1)th knee point K1-1 is illustrated as being 100% of the first maximum output brightness. It may be understood that there is virtually no knee point. Alternatively, the (1-1)th knee point K1-1 may be understood as being the same as the first maximum output brightness point PP1.

In addition, if the content image has the second maximum content brightness (1000 nits), the (1-2)th knee point K1-2 may be 62.5% of the first maximum output brightness. If the content image has the third maximum content brightness (2000 nits), the (1-3)th knee point K1-3 may be 60% of the first maximum output brightness. If the content image has the fourth maximum content brightness (4000 nits), the (1-4)th knee point K1-4 may be 50% of the first maximum output brightness. If the content image has the fifth maximum content brightness (10000 nits), the (1-5)th knee point K1-5 may be 40% of the first maximum output brightness. The numerical values are obtained through repeated clinical experiments, and as a result of the clinical experiments, when the content images having the first to fifth maximum content brightness, respectively are displayed on the image display device 100 having the first maximum output brightness, the knee points that allow a user to view the content image most comfortably and clearly are derived.

As described above, when the content image is displayed on the image display device 100, information on the maximum content brightness of the content image may be provided to the image display device 100. However, the maximum content brightness of the content image may not correspond to either of the first maximum content brightness 400 nits to the fifth maximum content brightness 10000 nits.

Therefore, the knee point may be defined as shown in FIG. 5 (5-2).

That is, for example, in FIG. 5 (5-2), if the content image has the maximum content brightness corresponding to a first maximum content brightness range (400 nits or less), the (1-1)th knee point (not shown) may be 100% of the first maximum output brightness. If the content image has the maximum content brightness corresponding to a second maximum content brightness range (more than 400 nits or less), the (1-2)th knee point K1-2 may be 62.5% of the first maximum output brightness. If the content image has the maximum content brightness corresponding to a third maximum content brightness range (more than 1000 nits and less than 2000 nits), the (1-3) knee point K1-3 may be 60% of the first maximum output brightness. If the content image has the maximum content brightness corresponding to a fourth maximum content brightness range (more than 2000 nits and less than 4000 nits), the (1-4)th knee point K1-4 may be 50% of the first maximum output brightness. If the content image has the maximum content brightness corresponding to a fifth maximum content brightness range (more than 4000 nits and less than 10000 nits), the (1-5)th knee point K1-5 may be 40% of the first maximum output brightness.

In the above description, the EOTF curve for the HDR image for the case where the maximum output brightness of the image display device 100 is the first maximum output brightness (400 nits) has been described. Hereinafter, an EOTF curve for an HDR image for the case where the maximum output brightness of the image display device 100 is the second maximum output brightness (e.g., 500 nits) is described with reference to FIG. 6.

Figure 6:
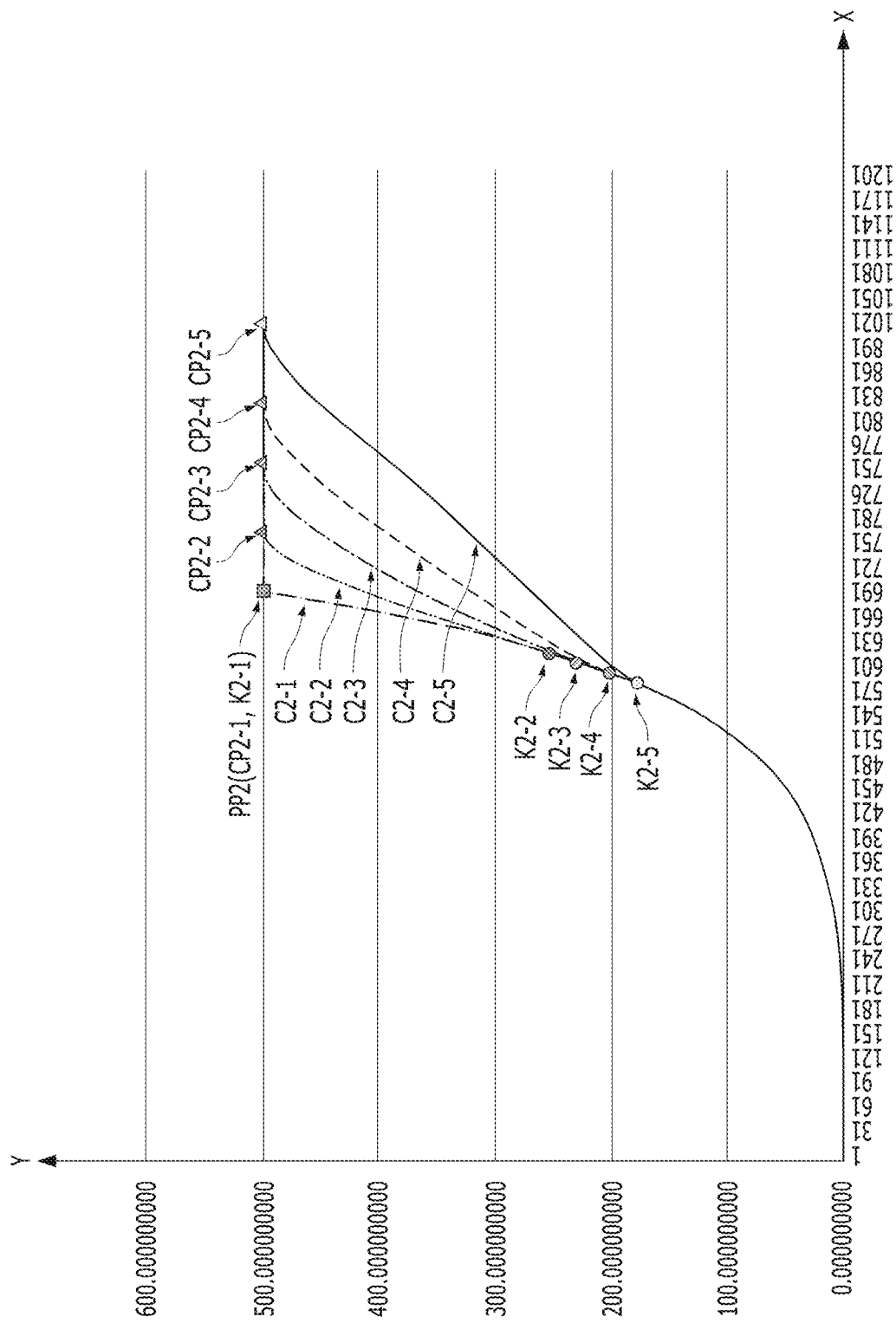
FIG. 6 is a diagram showing an EOTF curve for an HDR image according to an embodiment of the present disclosure.

FIG. 6 illustrates an EOTF curve for an HDR image according to an embodiment of the present disclosure. In FIG. 6, an HDR PQ curve according to an HDR PQ function is exemplarily illustrated as an example of an EOTF. In FIG. 6, an X-axis represents a brightness of a content image for an HDR, and a Y-axis represents a brightness of an output image of an image display device. In FIG. 6, it is assumed that a maximum output brightness of the image display device is a second maximum output brightness (500 nits).

A plurality of HDR PQ curves may be generated for the image display device 100 having the second maximum output brightness. For example, one of a plurality of the HDR PQ curves may be selected according to a maximum content brightness of the content image to be displayed on the image display device 100 and used to output the content image to the image display device 100. The maximum content brightness may be stored as metadata in the content image. Accordingly, when the content image is displayed on the image display device 100, information on the maximum content brightness of the content image may be provided to the image display device 100. Then, the controller 170 of the image display device 100 may select an HDR PQ curve corresponding to the maximum content brightness from a plurality of the HDR PQ curves, and display the content image according to the selected HDR PQ curve.

In FIG. 6, five HDR PQ curves C2-1, C2-2, C2-3, C2-4, and C2-5 are illustrated for the second maximum output brightness. Less or more HDR PQ curves may have been generated.

The (2-1)th HDR PQ curve C2-1 is for the case where the maximum content brightness of the content image is equal to the second maximum output brightness 500 (nits) as a sixth maximum content brightness (500 nits). When the maximum content brightness of the content image is equal to the maximum output brightness of the image display device 100, the content image having the sixth maximum content brightness may be displayed without being saturated on the image display device 100 even along the second curve C2 according to the HDR PQ standard curve H. Accordingly, the (2-1)th HDR PQ curve C2-1 may be equal to the second curve C2 of FIG. 2. When the (2-1)th HDR PQ curve C2-1 is compared to the HDR PQ standard curve H, a second maximum output brightness point PP2 may be defined. The (2-1)th HDR PQ curve C2-1 may be clipped with respect to a content image brightness that is brighter than the second maximum output brightness point PP2. The second maximum output brightness point PP2 may also be understood as a maximum content brightness point on the 2-1 HDR PQ curve C2-1, that is, a (2-1)th maximum content brightness point CP2-1.

The (2-2)th HDR PQ curve C2-2 is for the case where the maximum content brightness of the content image is a second maximum content brightness (1000 nits). When comparing the (2-2)th HDR PQ curve C2-2 with the (2-1)th HDR PQ curve C2-1, a (2-2)th knee point K2-2 and a (2-2)th maximum content brightness point CP2-2 may be defined. The (2-2)th HDR PQ curve C2-2 may branch from the (2-1)th HDR PQ curve C2-1 (or the HDR PQ standard curve H) by starting from the brightness of the content image brighter than the (2-2)th knee point K2-2, and may be clipped with respect to a content image brightness brighter than the (2-2)th maximum content brightness point CP2-2.

The (2-3)th HDR PQ curve C2-3 is for the case where the maximum content brightness of the content image is a third maximum content brightness 2000 nits. When the (2-3)th HDR PQ curve C2-3 is compared with the (2-1)th HDR PQ curve C2-1, a (2-3)th knee point K2-3 and a (2-3)th maximum content brightness point CP2-3 may be defined. The (2-3)th HDR PQ curve C2-3 may branch from the (2-1)th HDR PQ curve C2-1 (or the HDR PQ standard curve H) by starting from the (2-3)th knee point K2-3, and may be clipped with respect to a content image brightness brighter than the (2-3)th maximum content brightness point CP2-3. The (2-3)th knee point K2-3 may be formed at an output image brightness lower than the (2-2)th knee point K2-2, and the (2-3)th maximum content brightness point CP2-3 may be formed at a content image brightness brighter than the (2-2)th maximum content brightness point CP2-2.

The (2-4)th HDR PQ curve C2-4 is for the case where the maximum content brightness of the content image is a fourth maximum content brightness 4000 nits. When the (2-4)th HDR PQ curve C2-4 is compared with the (2-1)th HDR PQ curve C2-1, a (2-4)th knee point K2-4 and a (2-4)th maximum content brightness point CP2-4 may be defined. The (2-4)th HDR PQ curve C2-4 may branch from the (2-1)th HDR PQ curve C2-1 (or the HDR PQ standard curve H) by starting from the (2-4)th knee point K2-4, and may be clipped with respect to a content image brightness brighter than the (2-4)th maximum content brightness point CP2-4. The (2-4)th knee point K2-4 may be formed at an output image brightness lower than the (2-3)th knee point K2-3, and the (2-4)th maximum content brightness point CP2-4 may be formed at a content image brightness brighter than the (2-3)th maximum content brightness point CP2-3.

The (2-5)th HDR PQ curve C2-5 is for the case where the maximum content brightness of the content image is a fifth maximum content brightness (e.g., 10000 nits). When the (2-5)th HDR PQ curve C2-5 is compared with the (2-1)th HDR PQ curve C2-1, a (2-5)th knee point K2-5 and a (2-5)th maximum content brightness point CP2-5 may be defined. The (2-5)th HDR PQ curve C2-5 may branch from the (2-1)th HDR PQ curve C2-1 (or the HDR PQ standard curve H) by starting from the (2-5)th knee point K2-5, and may be clipped with respect to a content image brightness brighter than the (2-5)th maximum content brightness point CP2-5. The (2-5)th knee point K2-5 may be formed at an output image brightness lower than the (2-4)th knee point K2-4, and the (2-5)th maximum content brightness point CP2-5 may be formed at a content image brightness brighter than the (2-4)th maximum content brightness point CP2-4.

Figure 7:
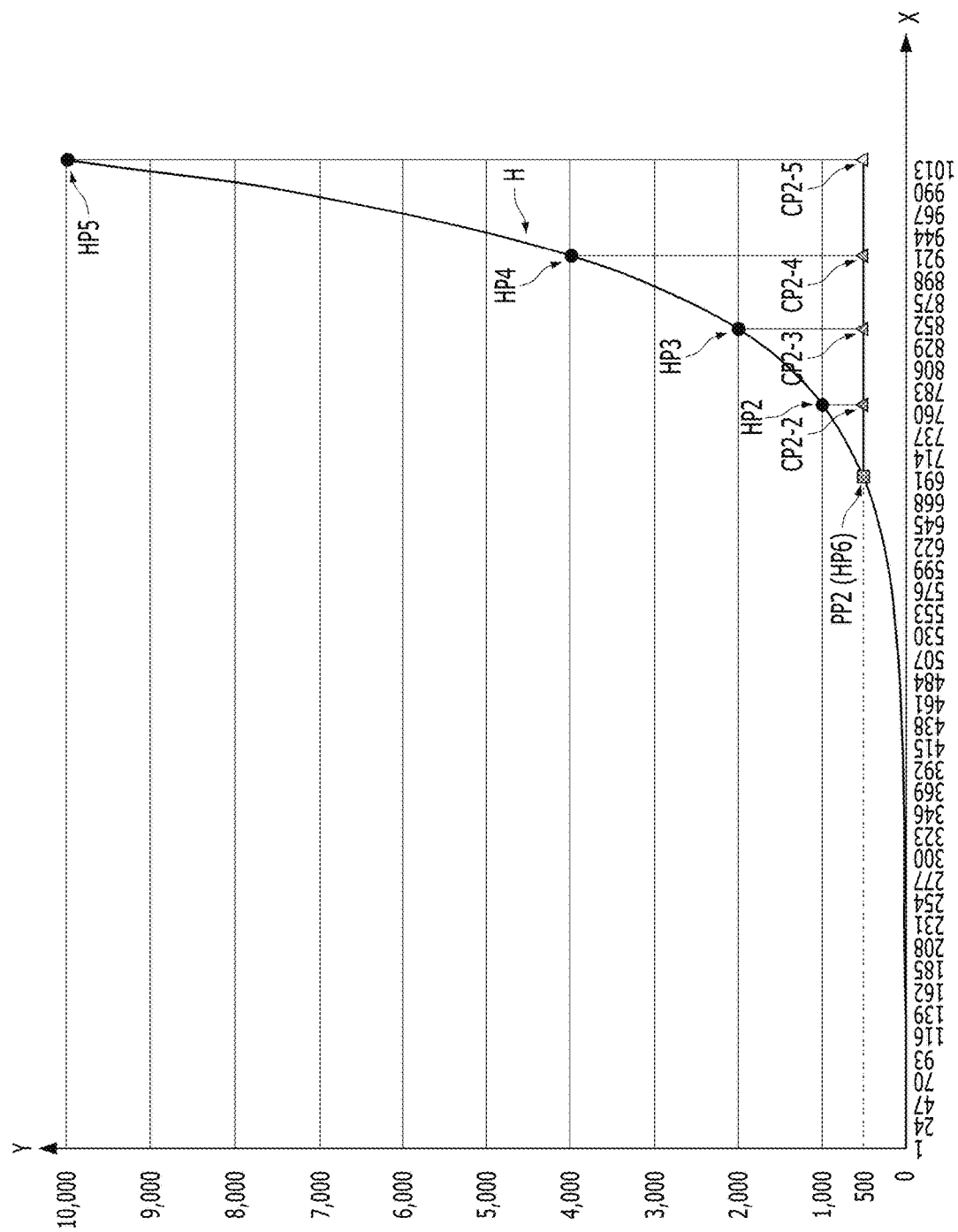
FIG. 7 is a graph for explaining a maximum output brightness point and a maximum content brightness point of FIG. 6.

The second maximum output brightness point PP2, the (2-2)th maximum content brightness point CP2-2, the (2-3)th maximum content brightness point CP2-3, the (2-4)th maximum content brightness point CP2-4, and the (2-5)th maximum content brightness point CP2-5 of FIG. 6 will be described with further reference to FIG. 7. FIG. 7 is a graph for describing the maximum output brightness point and the maximum content brightness point of FIG. 6.

FIG. 7 shows the HDRPQ standard curve H and the second curve C2 described in FIG. 2.

As shown in FIG. 7, on the HDR PQ standard curve H, a sixth HDR PQ point HP6, a second HDR PQ point HP2, a third HDR PQ point HP3, a fourth HDR PQ point HP4, and a fifth HDR PQ point HP5 corresponding to a sixth maximum content brightness (500 nits), a second maximum content brightness (1000 nits), a third maximum content brightness (2000 nits), a fourth maximum content brightness (4000 nits), and a fifth maximum content brightness 10000 nots, respectively may be displayed.

Points projected on the second curve C2 in the Y-axis direction from the sixth HDR PQ point HP6, the second HDR PQ point HP2, the third HDR PQ point HP3, the fourth HDR PQ point HP4, and the fifth HDR PQ point HP2 described in FIG. 6 may be the second maximum output brightness point PP2, the (2-2)th maximum content brightness point CP2-2, the (2-3)th maximum content brightness point CP2-3, the (2-4)th maximum content brightness point CP2-4, and the (2-5)th maximum content brightness point CP2-5, respectively.

The (2-2)th knee point K2-2, the (2-3)th knee point K2-3, the (2-4)th knee point K2-4, and the (2-5)th knee point K2-5 of FIG. 6 will be described with further reference to FIG. 8. FIG. 8 is a table for describing the knee point of FIG. 6.

As shown in FIG. 8 (8-1), when the maximum output brightness of the image display device is the second maximum output brightness (500 nits), a knee point according to each maximum content brightness (Maximum Content Light Level (MaxcLL)) of the content image may be defined as a percentage of the second maximum output brightness.

In FIG. 8 (8-1), when the content image has the sixth maximum content brightness (500 nits), the (2-1)th knee point K2-1 is illustrated as being 100% of the second maximum output brightness. It may be understood that there is virtually no knee point. Alternatively, the (2-1)th knee point K2-1 may be understood as being the same as the second maximum output brightness point PP2.

If the content image has the second maximum content brightness (1000 nits), the (2-2)th knee point K2-2 may be 50% of the second maximum output brightness. If the content image has the third maximum content brightness (2000 nits), the (2-3)th knee point K2-3 may be 45% of the second maximum output brightness. If the content image has the fourth maximum content brightness (4000 nits), the (2-4)th knee point K2-4 may be 40% of the second maximum output brightness. If the content image has the fifth maximum content brightness (10000 nits), the (2-5)th knee point K2-5 may be 35% of the second maximum output brightness. The numerical values are obtained through repeated clinical experiments, and as a result of the clinical experiments, when the content images having the sixth maximum content brightness and the second to fifth maximum content brightness are displayed on the image display device 100 having the second maximum output brightness, the knee points that allow a user to view the content image most comfortably and clearly are derived.

When the content image is displayed on the image display device 100, information on the maximum content brightness of the content image may be provided to the image display device 100. However, the maximum content brightness of the content image may not correspond to any of the sixth maximum content brightness (500 nits) and the second maximum content brightness (1000) nits to the fifth maximum content brightness (10000 nits).

Therefore, the knee point may be defined as illustrated in FIG. 8 (8-2).

That is, in FIG. 8 (8-2), for example, if the content image has the maximum content brightness corresponding to a sixth maximum content brightness range (500 nits or less), the (2-1)th knee point (not shown) may be 100% of the second maximum output brightness. If the content image has the maximum content brightness corresponding to a second maximum content brightness range (more than 500 nits and less than 1000 nits), the (2-2)th knee point K2-2 may be 50% of the second maximum output brightness. If the content image has a maximum content brightness corresponding to a third maximum content brightness range (more than 1000 nits and less than 2000 nits), the (2-3)th knee point K2-3 may be 45% of the second maximum output brightness. If the content image has the maximum content brightness corresponding to a fourth maximum content brightness range (more than 2000 nits and less than 4000 nits), the (2-4)th knee point K2-4 may be 40% of the second maximum output brightness. And, if the content image has the maximum content brightness corresponding to a fifth maximum content brightness range (more than 4000 nits and less than 10000 nits), the (2-5)th knee point K2-5 may be 35% of the second maximum output brightness.

In the above description, the EOTF curve for the HDR image for the case where the maximum output brightness of the image display device 100 is the second maximum output brightness (500 nits) has been described. In the following, an EOTF curve for an HDR image for the case where the maximum output brightness of the image display device 100 is a third maximum output brightness (e.g., 700 nits) is described with reference to FIG. 9.

Figure 9:
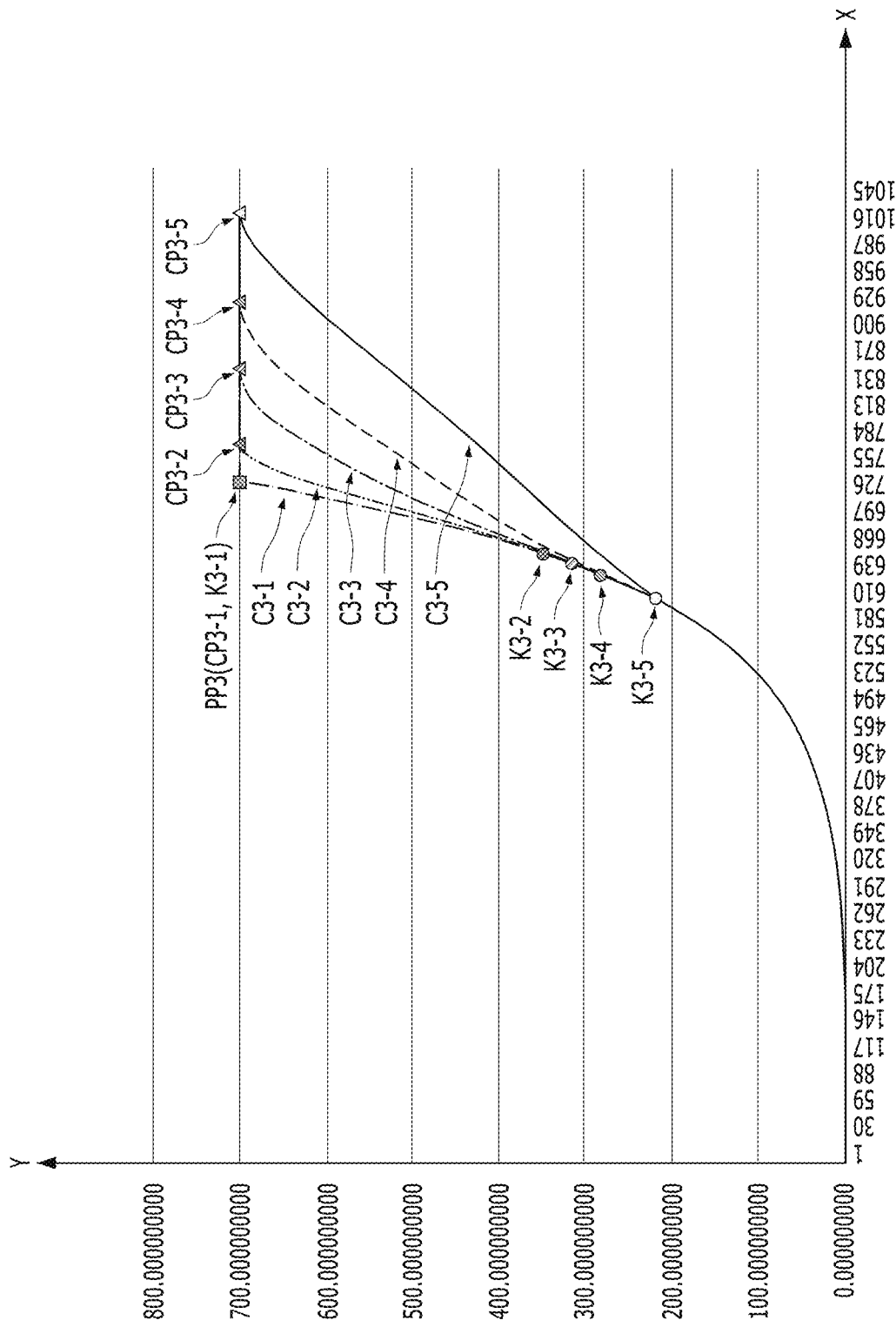
FIG. 9 is a diagram showing an EOTF curve for an HDR image according to an embodiment of the present disclosure.

FIG. 9 shows an EOTF curve for an HDR image according to an embodiment of the present disclosure. In FIG. 6, an HDR PQ curve according to an HDR PQ function is exemplarily illustrated as an example of an EOTF. In FIG. 9, an X-axis represents the brightness of a content image for an HDR, and a Y-axis represents the brightness of an output image of an image display device. In FIG. 9, it is assumed that a maximum output brightness of the image display device is the third maximum output brightness (700 nits).

A plurality of HDR PQ curves may be generated for the image display device 100 having the third maximum output brightness. For example, one of a plurality of the HDR PQ curves may be selected according to a maximum content brightness of a content image to be displayed on the image display device 100 and used to output the content image to the image display device 100. The maximum content brightness may be stored as metadata in the content image. Accordingly, when the content image is displayed on the image display device 100, information on the maximum content brightness of the content image may be provided to the image display device 100. Then, the controller 170 of the image display device 100 may select an HDR PQ curve corresponding to the maximum content brightness from a plurality of the HDR PQ curves, and display the content image according to the selected HDR PQ curve.

In FIG. 9, five HDR PQ curves C3-1, C3-2, C3-3, C3-4, and C3-5 are illustrated for a fifth maximum output brightness. Less or more HDR PQ curves may be generated.

The (3-1)th HDR PQ curve C3-1 is for the case where the maximum content brightness of the content image is equal to the third maximum output brightness 700 nits as a seventh maximum content brightness (700 nits). When the maximum content brightness of the content image is equal to the maximum output brightness of the image display device 100, the content image having the seventh maximum content brightness may be displayed without being saturated on the image display device 100 even along the third curve C3 according to the HDR PQ standard curve H. Accordingly, the (3-1)th HDR PQ curve C3-1 may be equal to the third curve C3 of FIG. 2. When the (3-1)th HDR PQ curve C3-1 is compared with the HDR PQ standard curve H, a third maximum output brightness point PP3 may be defined. The (3-1)th HDR PQ curve C3-1 may be clipped with respect to a content image brightness that is brighter than the third maximum output brightness point PP3. The third maximum output brightness point PP3 may also be understood as a maximum content brightness point, that is, a (3-1)th maximum content brightness point CP3-1 on the (3-1)th HDR PQ curve C3-1.

The (3-2)th HDR PQ curve C3-2 is for the case where the maximum content brightness of the content image is the second maximum content brightness (1000 nits). When the (3-2)th HDR PQ curve C3-2 is compared with the (3-1)th HDR PQ curve C3-1, a (3-2)th knee point K3-2 and a (3-2)th maximum content brightness point CP3-2 may be defined. The (3-2)th HDR PQ curve C3-2 may branch from the (3-1)th HDR PQ curve C3-1 (or the HDR PQ standard curve H) by starting from the brightness of the content image brighter than the (3-2)th knee point K3-2, and may be clipped with respect to a content image brightness brighter than the (3-2)th maximum content brightness point CP3-2.

The (3-3)th HDR PQ curve C3-3 is for the case where the maximum content brightness of the content image is the third maximum content brightness (2000 nits). When the (3-3)th HDR PQ curve C3-3 is compared with the (3-1)th HDR PQ curve C3-1, a (3-3)th knee point K3-3 and a (3-3)th maximum content brightness point CP3-3 may be defined. The (3-3)th HDR PQ curve C3-3 may branch from the (3-1)th HDR PQ curve C3-1 (or the HDR PQ standard curve H) by starting from the (3-3)th knee point K3-3, and may be clipped with respect to a content image brightness brighter than the (3-3)th maximum content brightness point CP3-3. The (3-3)th knee point K2-3 may be formed at an output image brightness lower than the (3-2)th knee point K3-2, and the (3-3)th maximum content brightness point CP3-3 may be formed at a content image brightness brighter than the (3-2)th maximum content brightness point CP3-2.

The (3-4)th HDR PQ curve C3-4 is for the case where the maximum content brightness of the content image is the fourth maximum content brightness (4000 nits). When the (3-4)th HDR PQ curve C3-4 is compared with the (3-1)th HDR PQ curve C3-1, a (3-4)th knee point K3-4 and a (3-4)th maximum content brightness point CP3-4 may be defined. The (3-4)th HDR PQ curve C3-4 may branch from the (3-1)th HDR PQ curve C3-1 (or the HDR PQ standard curve H) by starting from the (3-4)th knee point K3-4, and may be clipped with respect to a content image brightness brighter than the (3-4)th maximum content brightness point CP3-4. The (3-4)th knee point K3-4 may be formed at an output image brightness lower than the (3-3)th knee point K3-3, and the (3-4)th maximum content brightness point CP3-4 may be formed at a content image brightness brighter than the (3-3)th maximum content brightness point CP3-3.

The (3-5)th HDR PQ curve C3-5 is for the case where the maximum content brightness of the content image is the fifth maximum content brightness (e.g., 10000 nits). When the (3-5)th HDR PQ curve C3-5 is COMPARED with the (3-1)th HDR PQ curve C3-1, a (3-5)th knee point K3-5 and a (3-5)th maximum content brightness point CP3-5 may be defined. The (3-5)th HDR PQ curve C3-5 may branch from the (3-1)th HDR PQ curve C3-1 (or the HDR PQ standard curve H) by starting from the (3-5)th knee point K3-5, and may be clipped with respect to a content image brightness brighter than the (3-5)th maximum content brightness point CP3-5. The (3-5)th knee point K3-5 may be formed at an output image brightness lower than the (3-4)th knee point K3-4, and the (3-5)th maximum content brightness point CP3-5 may be formed at a content image brightness brighter than the (3-4)th maximum content brightness point CP3-4.

The third maximum output brightness point PP3, the (3-2)th maximum content brightness point CP3-2, the (3-3)th maximum content brightness point CP3-3, the (3-4)th maximum content brightness point CP3-4, and the (3-5)th maximum content brightness point CP3-5 of FIG. 9 will be described with further reference to FIG. 10. FIG. 10 is a graph for describing the maximum output brightness point and the maximum content brightness point of FIG. 9.

Figure 10:
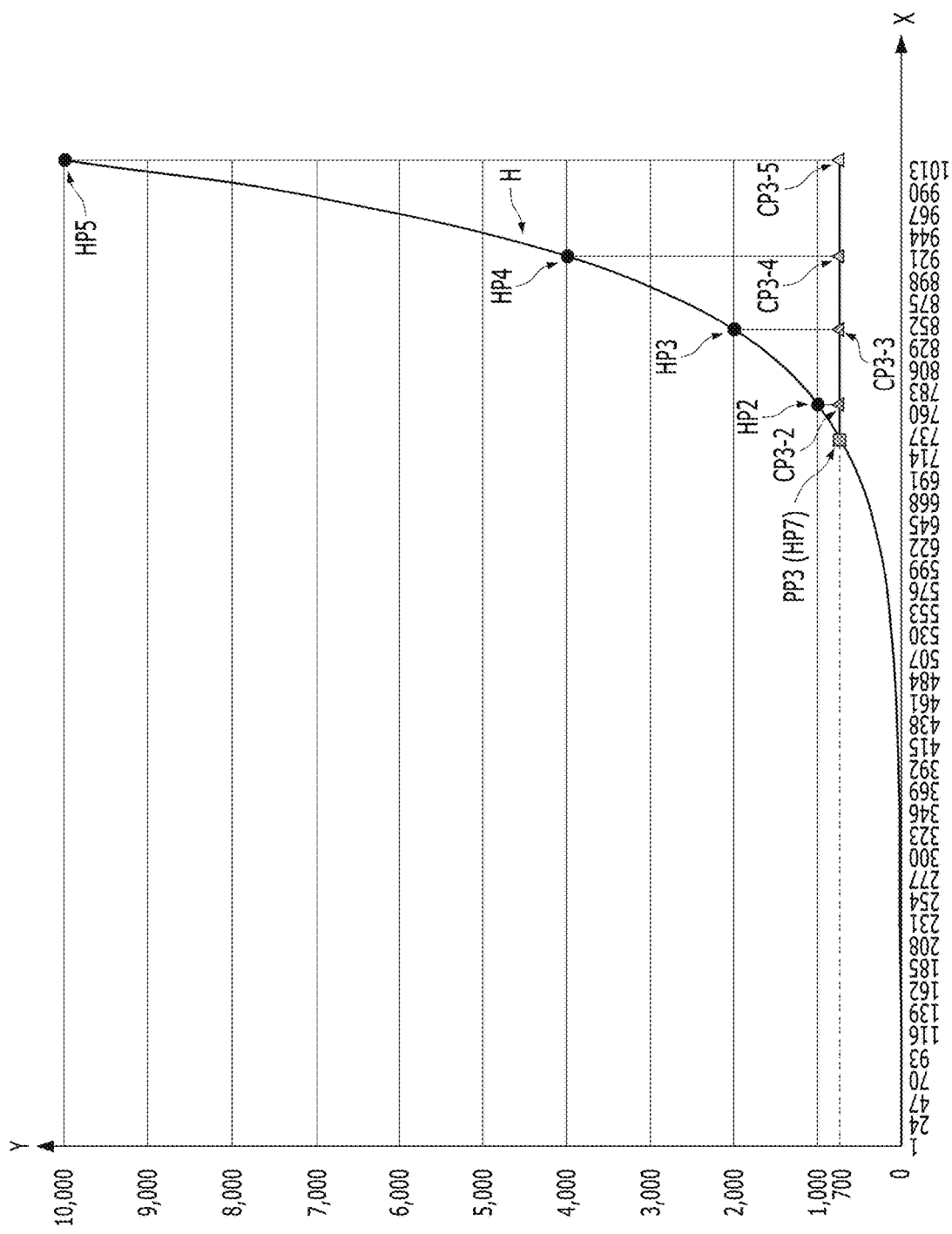
FIG. 10 is a graph for explaining a maximum output brightness point and a maximum content brightness point of FIG. 9.

FIG. 10 shows the HDRPQ standard curve H and the third curve C3 described in FIG. 2.

As shown in FIG. 10, on the HDR PQ standard curve H, a seventh HDR PQ point HP7, a second HDR PQ point HP2, a third HDR PQ point HP3, a fourth HDR PQ point HP4, and a fifth HDR PQ point HP5 corresponding to a seventh maximum content brightness (700 nits), a second maximum content brightness (1000 nits), a third maximum content brightness (2000 nits), a fourth maximum content brightness (400 nits), and a fifth maximum content brightness (10000 nits), respectively may be denoted.

Points projected on the third curve C3 in the Y-axis direction from the seventh HDR PQ point HP7, the second HDR PQ point HP2, the third HDR PQ point HP3, the fourth HDR PQ point HP4, and the fifth HDR PQ point HP2 may be the third maximum output brightness point PP3, the (3-2)th maximum content brightness point CP3-2, the (3-3)th maximum content brightness point CP3-3, the (3-4)th maximum content brightness point CP3-4, and the (3-5)th maximum content brightness point CP3-5 described in FIG. 9, respectively.

The (3-2)th knee point K3-2, the (3-3)th knee point K3-3, the (3-4)th knee point K3-4, and the (3-5)th knee point K3-5 of FIG. 9 will be described with further reference to FIG. 11. FIG. 11 is a table for describing the knee point in FIG. 9.

In FIG. 11 (11-1), when the content image has the seventh maximum content brightness 700 nits, the (3-1)th knee point (not shown) is illustrated as being 100% of the third maximum output brightness. This may be understood as having substantially no knee point. Alternatively, the (3-1)th knee point K3-1 may be understood as being the same as the third maximum output brightness point PP3.

In addition, if the content image has the second maximum content brightness (1000 nits), the (3-2)th knee point K3-2 may be 50% of the third maximum output brightness. If the content image has the third maximum content brightness (2000 nits), the (3-3)th knee point K3-3 may be 45% of the third maximum output brightness. If the content image has the fourth maximum content brightness (4000 nits), the (3-4)th knee point K3-4 may be 40% of the third maximum output brightness. And, if the content image has the fifth maximum content brightness (10000 nits), the (3-5)th knee point K3-5 may be 30% of the third maximum output brightness. The numerical values are obtained through repeated clinical experiments. As a result of the clinical experiments, when the content images having the seventh maximum content brightness and the second to fifth maximum content brightness, respectively are displayed on the image display device 100 having the third maximum output brightness, the knee points that allow a user to view the content image most comfortably and clearly are derived.

As described above, when the content image is displayed on the image display device 100, information on the maximum content brightness of the content image may be provided to the image display device 100. Yet, the maximum content brightness of the content image may not correspond to any of the seventh maximum content brightness (700 nit)s and the second maximum content brightness (1000 nits) to the fifth maximum content brightness (10000 nits).

Therefore, the knee point may be defined as illustrated in FIG. 11 (11-2).

That is, in FIG. 8 (8-2), for example, if the content image has the maximum content brightness corresponding to a seventh maximum content brightness range (700 nits or less), the (3-1)th knee point (not shown) may be 100% of the third maximum output brightness. If the content image has the maximum content brightness corresponding to a second maximum content brightness range (more than 700 nits and less than 1000 nits), the (3-2)th knee point K3-2 may be 50% of the third maximum output brightness. If the content image has the maximum content brightness corresponding to a third maximum content brightness range (more than 1000 nits and less than 2000 nits), the (3-3)th knee point K3-3 may be 45% of the third maximum output brightness. If the content image has the maximum content brightness corresponding to a fourth maximum content brightness range (more than 2000 nits and less than 4000 nits), the (3-4)th knee point K3-4 may be 40% of the third maximum output brightness. And, if the content image has the maximum content brightness corresponding to a fifth maximum content brightness range (more than 4000 nits and less than 10000 nits), the (3-5)th knee point K3-5 may be 30% of the third maximum output brightness.

Figure 12:
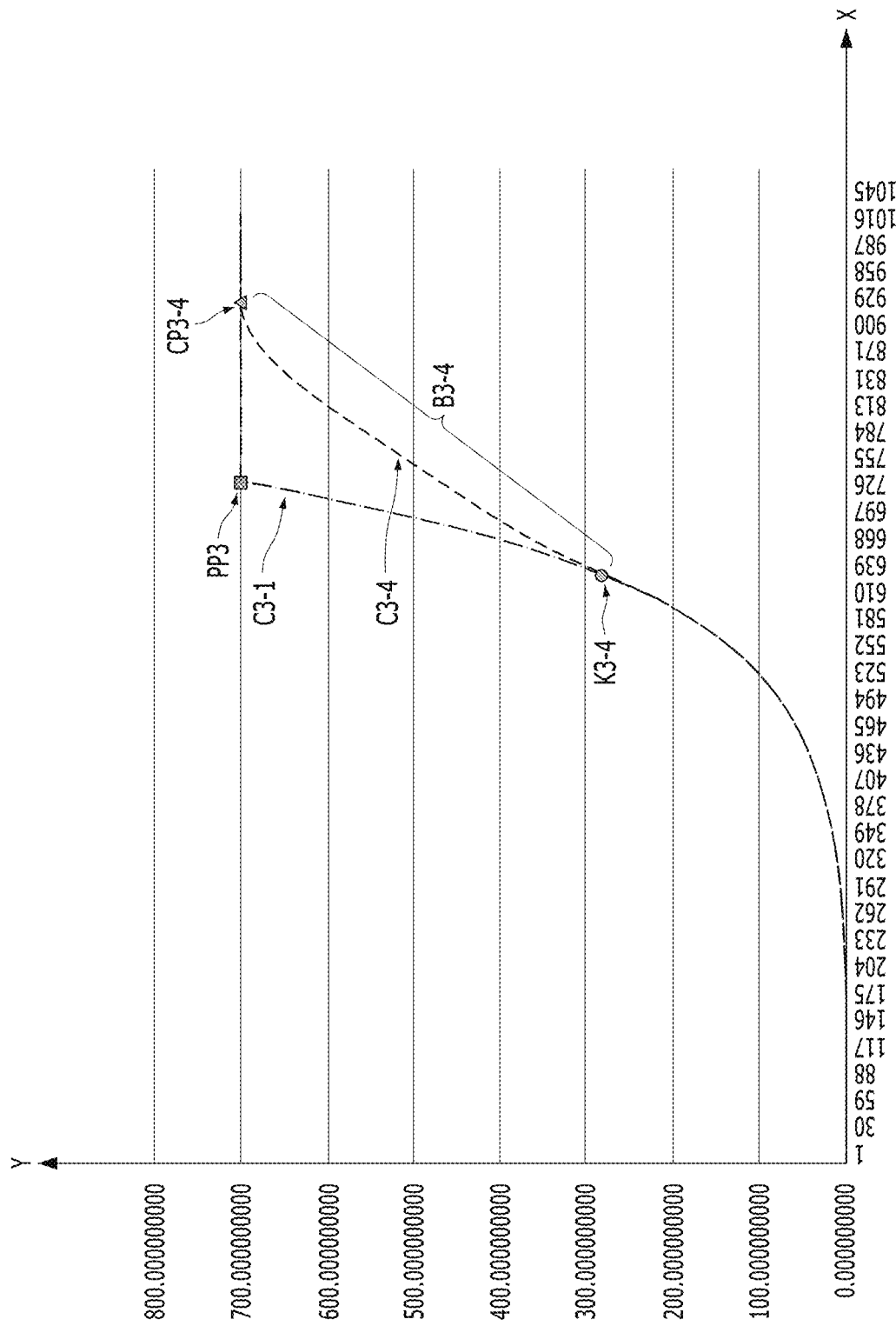
FIG. 12 is a diagram showing a 3-1 HDR curve and a 3-4 HDR curve of FIG. 9.

As described above, an EOTF curve for an HDR image may be provided differently according to the maximum output brightness of the display panel of the image display device and the maximum content brightness of the content image, and a knee point and a maximum content brightness point may be defined for each HDR image EOTF curve. Hereinafter, how a curve between a knee point and a maximum content brightness point in each HDR image EOTF curve may be defined will be described with further reference to FIG. 12. FIG. 12 shows the (3-1)th HDR curve and the (3-4)th HDR curve of FIG. 9.

The (3-4)th HDR curve C3-4 described above will be described as an example with respect to a curve between a knee point and a maximum content brightness point in each HDR image EOTF curve. Certainly, this is applicable to other HDR curves.

As described above, when the maximum output brightness of the image display device 100 is the third maximum output brightness (700 nits), the third maximum output brightness point PP3 may be defined on the (3-1)th HDR curve C3-1, and the (3-4)th knee point K3-4 and the (3-4)th maximum content brightness point CP3-4 may be defined on the (3-4)th HDR curve C3-4.

Based on the Quadratic Bezier Curve using the three points of the third maximum output brightness point PP3, the (3-4)th knee point K3-4, and the (3-4)th maximum content brightness point CP3-4, a curve B3-4 between the (3-4)th knee point K3-4 and the (3-4)th maximum content brightness point CP3-4 may be defined on the (3-4)th HDR curve C3-4. An exemplary equation for the Quadratic Bezier Curve is as follows.

$$B(t) = (1-t)^2 P_0 + 2(1-t)tP_1 + t^2 P_2 \quad \text{[Equation 1]}$$

Here, $P_0$, $P_1$, and $P_2$ may correspond to the (3-4)th knee point K3-4, the third maximum output brightness point PP3, and the (3-4)th maximum content brightness point CP3-4, respectively. The equation may be modified and used.

Figure 13:
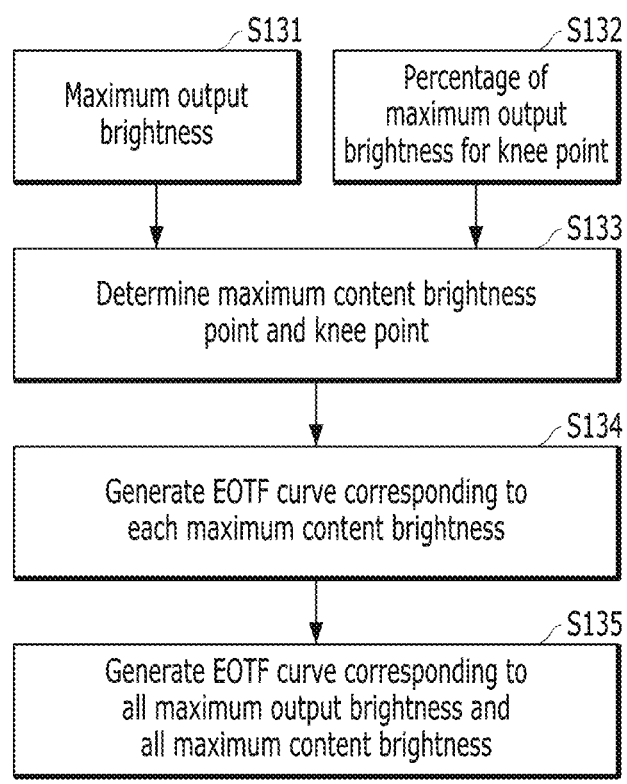
FIG. 13 is a diagram showing a process of generating an EOTF for an HDR image according to an embodiment of the present disclosure.

Hereinafter, a process of generating an EOTF for an HDR image for the image display device 100 will be described with reference to FIG. 13. FIG. 13 illustrates a process of generating an EOTF for an HDR image according to an embodiment of the present disclosure.

A maximum output brightness for the image display device 100 may be defined [S131]. The maximum output brightness may be defined by at least one of the performance of the display panel of the image display device 100 and a user preference thereof.

A plurality of maximum output brightness are defined for the image display device 100. As long as the maximum output brightness is selected by a user, the image display device 100 may operate according to the maximum output brightness. For example, the controller 170 of the image display device 100 may provide menus of "normal", "high", and "very high" to the user through a user interface screen for maximum output brightness setting. When the "normal" menu is selected, the controller 170 may set the maximum output brightness to a first maximum output brightness (e.g., 400 nits). The controller 170 may set the maximum output brightness to a second maximum output brightness (e.g., 500 nits) when the "high" menu is selected. And, the controller 170 may set the maximum output brightness to a third maximum output brightness (e.g., 700 nits) when the "very high" menu is selected.

Next, a percentage of the maximum output brightness for a knee point of the EOTF for the HDR image may be determined [S132]. As described above, the percentage may be determined through clinical experiments according to the maximum output brightness and the maximum content brightness.

Next, a maximum content brightness point and a knee point corresponding to each maximum content brightness may be determined based on the HDR PQ standard curve H and the maximum output brightness [S133].

Next, an EOTF curve for an HDR image corresponding to each maximum content brightness may be generated based on the maximum content brightness point and the knee point [S134].

In this way, a plurality of EOTF curves for the HDR image corresponding to all maximum output brightness and all maximum content brightness may be generated [S135]. The generated EOTF curve for HDR image and related data may be stored in the memory 140 of the image display device 100.

Figure 14:
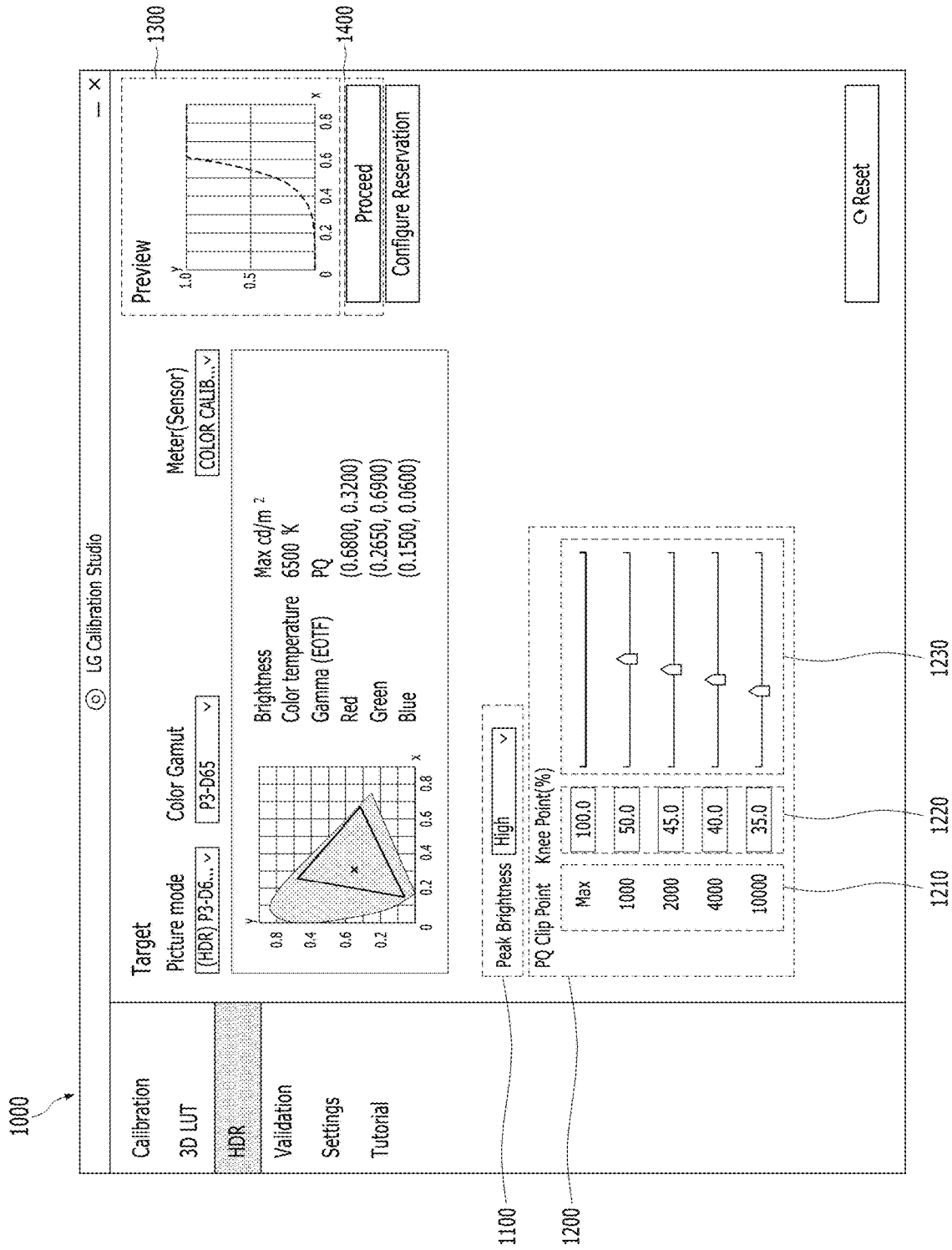
FIG. 14 is a diagram showing a user interface for calibrating an EOTF curve for an HDR image according to an embodiment of the present disclosure.

In the image display device 100, the EOTF curve for the HDR image may be calibrated according to user's preference. This will be described further with reference to FIG. 14. FIG. 14 illustrates a user interface for calibrating an EOTF curve for an HDR image according to an embodiment of the present disclosure.

In response to a prescribed user input through the user input interface 150, the controller 170 of the image display device 100 may control the user interface 1000 for calibrating the EOTF curve for the HDR image, as shown in FIG. 14, to be displayed on the display 180.

First, in the user interface 1000, the user may select one of "normal", "high", and "very high" menus in the maximum output brightness setting 1100. In FIG. 14, it is illustrated that the "high" menu is selected and the maximum output brightness of the image display device 100 is set to the second maximum output brightness (500 nits).

In the EOTF calibration setting 1200 of the user interface 1000, a plurality of knee points 1220 respectively corresponding to the selected maximum output brightness and each maximum content brightness 1210, i.e., the seventh maximum content brightness Max, the second maximum content brightness (1000 nits), the third maximum content brightness (2000 nits), the second maximum content brightness (1000 nits), and the third maximum content brightness (2000 nits) may be displayed as percentages of the maximum output brightness, respectively. In addition, in the EOTF calibration setting 1200, a plurality of slide bars 1230 for calibrating a plurality of the knee points 1220, respectively may be displayed. The user may calibrate the knee point of the EOTF curve for the HDR image according to the maximum output brightness and the corresponding maximum content brightness through the corresponding slide bar (e.g., through slide bar drag). As the knee point is calibrated, the EOTF curve for the HDR image may be calibrated.

The calibrated EOTF curve for the HDR image may be displayed in a preview area 1300 of the user interface 1000 as a preview of the user. Therefore, the user may visually and conveniently check how much the HDR image EOTF curve is calibrated while viewing the EOTF curve for the HDR image displayed in the preview area 1300.

After calibration of each HDR image EOTF curve is performed, a proceed menu 1400 of the user interface 1000 is selected, so that each of the calibrated HDR image EOTF curves may be applied to the image display device 100.

Various aspects may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 170 of the image display device and a controller of the remote controller. The foregoing aspects are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary aspects described herein may be combined in various ways to obtain additional and/or alternative exemplary aspects.

What is claimed is:

1. An apparatus for displaying an image, the apparatus comprising:
   a display;
   a storage unit storing a plurality of Electro-Optical Transfer Function (EOTF) curves for displaying a content image for High Dynamic Range (HDR); and
   a controller configured to control to display the content image using an EOTF curve related to a maximum output brightness of the display and a maximum content brightness of the content image among a plurality of the EOTF curves,
   wherein the plurality of the EOTF curves have different knee points and maximum content brightness points according to the maximum output brightness and the maximum content brightness, respectively, and
   wherein each of the different knee points is defined by its corresponding EOTF curve branching from a same EOTF standard curve.

2. The apparatus of claim 1, wherein the same EOTF standard curve is an HDR Perceptual Quantizer (PQ) standard curve.

3. The apparatus of claim 2, wherein a first EOTF curve among the plurality of the EOTF curves includes a first maximum output point according to the maximum content brightness equal to the maximum output brightness.

4. The apparatus of claim 3, wherein the first EOTF curve is generated based on the EOTF standard curve.

5. The apparatus of claim 4, wherein a second EOTF curve among the plurality of the EOTF curves includes a first knee point and a second maximum content brightness point according to the maximum content brightness greater than the maximum output brightness.

6. The apparatus of claim 5, wherein the second EOTF curve is generated in a manner that a Quadratic Bezier Curve based on a first maximum output point, a first knee point, and a second maximum content brightness point is reflected on the first EOTF curve.

7. The apparatus of claim 1, wherein information on the maximum content brightness is stored as metadata in the content image.

8. The apparatus of claim 1, wherein the controller is further configured to control the display to display a user interface for calibrating the plurality of the EOTF curves.

9. The apparatus of claim 8, wherein the controller is further configured to provide a menu for setting the maximum output brightness of the display and a menu for calibrating each of the plurality of EOTF curves according to the set maximum output brightness through the user interface.

10. The apparatus of claim 9, wherein the controller is further configured to control the calibrated EOTF curve to be displayed for a preview on the user interface.

11. A method of controlling an image display apparatus, the method comprising:
    storing a plurality of Electro-Optical Transfer Function (EOTF) curves for displaying a content image for High Dynamic Range (HDR); and
    displaying the content image based on a maximum output brightness of a display and an EOTF curve corresponding to a maximum content brightness of the content image among a plurality of the EOTF curve curves,
    wherein the plurality of the EOTF curves have different knee points and maximum content brightness points according to the maximum output brightness and the maximum content brightness, respectively, and
    wherein each of the different knee points is defined by its corresponding EOTF curve branching from a same EOTF standard curve.

12. The method of claim 11, wherein the EOTF standard curve is a HDR Perceptual Quantizer (PQ) standard curve.

13. The method of claim 12, wherein a first EOTF curve among the plurality of the EOTF curves includes a first maximum output point according to the maximum content brightness equal to the maximum output brightness.

14. The method of claim 13, wherein the first EOTF curve is generated based on the EOTF standard curve.

15. The method of claim 14, wherein a second EOTF curve among the plurality of the EOTF curves includes a first knee point and a second maximum content brightness point according to the maximum content brightness greater than the maximum output brightness.

16. The method of claim 15, wherein the second EOTF curve is generated in a manner that a Quadratic Bezier Curve based on a first maximum output point, a first knee point, and a second maximum content brightness point is reflected on the first EOTF curve.

17. The method of claim 11, wherein information on the maximum content brightness is stored as metadata in the content image.

18. The method of claim 11, comprising displaying a user interface for calibrating the plurality of the EOTF curves.

19. The method of claim 18, wherein a menu for setting the maximum output brightness of the display and a menu for calibrating each of the plurality of EOTF curves according to the set maximum output brightness are provided through the user interface.

20. The method of claim 19, comprising displaying the calibrated EOTF curve for a preview on the user interface.

* * * * *